US010126755B1

(12) United States Patent
Lavi et al.

(10) Patent No.: US 10,126,755 B1
(45) Date of Patent: Nov. 13, 2018

(54) METHOD, APPARATUS AND SYSTEM FOR WIRELESS AUTOMOTIVE TRAILER ASSIST IN VARIOUS MANEUVERS

(71) Applicant: GM GLOBAL TECHNOLOGY OPERATIONS LLC, Detroit, MI (US)

(72) Inventors: Nadav Lavi, Ramat-Hasharon (IL); Kobi J. Scheim, Pardess Hanna (IL); Daniel T. Cohen, West Bloomfield, MI (US); Andrew R. Camden, Royal Oak, MI (US); Anil Bika, Rochester Hills, MI (US); Yohay Buchbut, Pardess Hanna (IL); Nadav Levkovich, Givatayim (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/655,462

(22) Filed: Jul. 20, 2017

(51) Int. Cl.
*G05D 1/02* (2006.01)
*G05D 1/00* (2006.01)

(52) U.S. Cl.
CPC ........... *G05D 1/028* (2013.01); *G05D 1/0088* (2013.01); *G05D 1/0214* (2013.01); *G05D 2201/0213* (2013.01)

(58) Field of Classification Search
CPC .... G05D 1/0276; G05D 1/028; G05D 1/0225; G01S 5/14; A01D 34/008; G07C 5/008
USPC ................ 701/23, 24, 25, 408–409; 180/167
See application file for complete search history.

(56) References Cited

U.S. PATENT DOCUMENTS

| | | | |
|---|---|---|---|
| 6,879,878 B2 * | 4/2005 | Glenn | B25J 9/1689 318/568.11 |
| 8,892,451 B2 * | 11/2014 | Everett | G06Q 40/08 705/4 |
| 9,754,424 B2 * | 9/2017 | Ling | G06Q 40/08 |

(Continued)

FOREIGN PATENT DOCUMENTS

| | | | | |
|---|---|---|---|---|
| DE | 202012006089 U1 * | 7/2012 | ............. | B62D 59/04 |
| DE | 102013015738 A1 * | 4/2014 | ............... | B60D 1/36 |

(Continued)

OTHER PUBLICATIONS

Laser scanner-based navigation and motion planning for truck-trailer combinations; Roland Stahn;Tobias Stark; Andreas Stopp; 2007 IEEE/ASME international conference on advanced intelligent mechatronics; pp. 1-6; (Year: 2007).*

On the feedback control of hitch angle through torque-vectoring; M. Zanchetta; D. Tavernini; A. Sorniotti; P. Gruber; B. Lenzo; A. Ferrara; W. De Nijs; K. Sannen; J. De Smet; 2018 IEEE 15th Inter. Workshop on Advanced Motion Control; pp. 535-540; year 2018.*

(Continued)

*Primary Examiner* — Cuong H Nguyen
(74) *Attorney, Agent, or Firm* — Lorenz & Kopf LLP

(57) ABSTRACT

A system, apparatus and method for wireless communication in an ecosystem of wireless devices interconnected for assisting a vehicle, or a vehicle and trailer in maneuvers which includes at least one radio frequency (RF) system configured to operate as part of a vehicle system, a trailer system or combination thereof, or as an independent unit with wireless connectivity to the vehicle and/or trailer system or other independent unit to form the ecosystem of wireless devices interconnected. The RF system includes a transceiver for the wireless connectivity with extended range ultra-wide band capabilities wherein each RF system includes: at least one vehicle RF system, at least one trailer RF system and at least one independent RF unit system.

20 Claims, 8 Drawing Sheets

(56) References Cited

U.S. PATENT DOCUMENTS

| | | | | |
|---|---|---|---|---|
| 2004/0199289 | A1* | 10/2004 | Glenn | B25J 9/1689 |
| | | | | 700/245 |
| 2013/0013347 | A1* | 1/2013 | Ling | G06Q 40/08 |
| | | | | 705/4 |
| 2013/0013348 | A1* | 1/2013 | Ling | G06Q 40/08 |
| | | | | 705/4 |
| 2017/0059346 | A1* | 3/2017 | Gray | G01C 21/00 |

FOREIGN PATENT DOCUMENTS

| | | | | |
|---|---|---|---|---|
| DE | 102014108486 A1 * | 7/2015 | | G05D 1/0044 |
| DE | 102014108482 A1 * | 12/2015 | | B62D 13/06 |
| DE | 102016224528 A1 * | 6/2018 | | B60W 50/08 |
| EP | 2669124 A1 * | 12/2013 | | G05D 1/0033 |
| EP | 2722215 A2 * | 4/2014 | | B60D 1/245 |

OTHER PUBLICATIONS

Neural network based control for a backward maneuvering trailer truck; R. S. Woodley; L Acar; Proceedings of the 37th IEEE Conference on Decision and Control (Cat. No. 98CH36171); vol. 2; pp. 1611-1616 vol. 2 (Year: 1998).*

Estimation of LTR rollover index for a high-sided tractor semitrailer vehicle under extreme crosswind conditions through dynamic simulation; Abubaker Abdulwahab; Rakesh Mishra; 2017 23rd International Conference on Automation and Computing (ICAC); pp. 1-6. (Year: 2017).*

Ford. 2017 Super Duty Pickups. A New Level of Toughness.

* cited by examiner

METHOD, APPARATUS AND SYSTEM FOR WIRELESS AUTOMOTIVE TRAILER ASSIST IN VARIOUS MANEUVERS

INTRODUCTION

The present disclosure generally relates to operations of a vehicle and trailer, and more particularly relates to a system and method for assisting in operating the vehicle and trailer combination in various maneuvers.

Vehicles often utilize a wiring harness to communicate with a trailer. However, when the vehicle is not yet connected to the trailer, the wiring harness is not available to establish communications. Moreover, even when a wiring harness is available and connected, the wiring harness only provides a limited amount of assistance in the vehicle operation. In the past, the operator may employ a third party not operating the vehicle trailer combination who stands at an independent location with a field of view of the trailer backing up and may use hand or voice gestures to assist and/or direct the operator of the vehicle trailer combination in the backup maneuver. This is inefficient and requires additional personnel who may not be available. Further, operators or drivers often are not well versed in operating the vehicle trailer combination, and as a result may not have the requisite skill to perform certain maneuvers when operating the vehicle trailer combination. In addition, when operating autonomous or semi-autonomous vehicles with a trailer, such operations require more exact positioning data and feedback communications for safe operations of the combination trailer vehicle which conventional wiring trailer harness systems are unable to provide.

Accordingly, it is desirable to utilize one or more wireless radio frequency (RF) devices with a transceiver in conjunction with a vehicle trailer combination to provide information to assist in operating the vehicle trailer combination in autonomous, semi-autonomous, or driver modes of operation when performing certain maneuvers. Furthermore, other desirable features and characteristics of the present invention will become apparent from the subsequent detailed description of the invention and the appended claims, taken in conjunction with the accompanying drawings and the background of the invention.

SUMMARY

In one embodiment, for example, a wireless ecosystem of interconnected RF devices is provided. That is, a system for communicating data between a plurality of wireless devices for assisting a vehicle and trailer in various maneuvers, including: at least a first and second radio frequency (RF) device attached or positioned with a vehicle, trailer and/or a desired location and coupled together in a manner to allow for data exchanges therebetween wherein both the first and second RF device are each configured with a respective ultra-wide band (UWB) transceiver for enabling, using UWB wireless protocols, couplings at extended ranges therebetween, each RF device further includes: a processor locally disposed within each RF device for generating data packet for sending between the first and second RF device to enable a measurement of a distance to be determined between each device based on a transmission time of a data packet transmitted back and forth between each RF device, the processor configured to: generate a request for message data between RF devices wherein the first RF device sends message data in response thereof and the second RF device receives the message data or vice versa; compute, using algorithmic solutions, one or more measurements from a transmission time ascertained of a sending and a receiving of the message data between the RF devices to determine at least a distance between each of the RF devices having performed the sending and receiving of the message data, and further using measurements ascertained to determine a relative physical position of a vehicle associated with at least one of the RF devices; and generate data with respect to the measurements and physical position of the vehicle for either an operator of the vehicle or for a vehicle control system to cause the vehicle to maneuver to the desired location or follow a path to the desired location.

The system further includes: a function of the RF device for marking a point of the desired location or a series of points for the path to the desired location to navigate the vehicle to maneuver to the desired location or for marking in an alternate, a point of an undesired location or series of points of undesired locations in manner to enable the vehicle to maneuver by a path to the desired location while avoiding the undesired location or locations. The system further includes: at least one or more transceivers to transmit data in wireless protocols different from the UWB protocol for coupling with a vehicle, a trailer, or a mobile device. The system includes: attaching the first and second RF devices to a vehicle and trailer respectively, for monitoring the trailer when maneuvering the trailer by the vehicle by computing measurements and/or changes in measurements therebetween. Additionally, the system includes attaching the first and second RF devices to a load associated with a vehicle, trailer, or a combination thereof, for monitoring the load when maneuvering the vehicle or trailer by computing measurements and/or changes in measurements with respect to the load and the vehicle or trailer respectively. The processor is further configured to: generate data with respect to the measurements and physical position of the vehicle for either an operator of the vehicle or for a vehicle control system to cause the vehicle to maneuver in manner to avoid a particular location or to follow a path around particular locations.

In another embodiment, for example, a wireless ecosystem of interconnected RF devices is provided. That is, an apparatus for wireless communication is provided in an ecosystem of wireless devices interconnected for assisting a vehicle, or a vehicle and trailer in maneuvers, including: at least one radio frequency (RF) system configured to operate as part of a vehicle system, a trailer system or combination thereof, or as an independent unit with wireless connectivity to the vehicle and/or trailer system or other independent unit to form the ecosystem of wireless devices interconnected wherein the RF system includes: a transceiver for the wireless connectivity with extended range capabilities.

Each RF system further includes: at least one vehicle RF system, at least one trailer RF system and at least one independent RF unit system; a processor disposed within the RF system communicatively coupled to at least another one RF system, the processor configured to: generate a unique data packet for each of the at least one RF system; generate an instruction for each of the at least one RF system to transmit the unique packet associated with the at least one RF system; receive, from the at least one RF system at least one response packet transmitted from the at least another one RF system wherein the at least another one RF system corresponds to the vehicle, trailer, or independent unit or is a combination thereof; determine, for each received response packet, a distance between a corresponding receiving one of the at least one vehicle RF system, one trailer RF system or one independent RF unit system and a corresponding transmitting one of the at least, one vehicle RF system, one trailer RF system or one independent RF unit system based upon a time of flight of a corresponding transmitted unique packet and a corresponding response packet; determine a relative physical position of one or more of at least one vehicle RF system, one trailer RF system or one independent RF unit system, and each of the at least one vehicle RF system, one trailer RF system or one independent RF unit system based upon the determined distance; and generate, based upon the determined relative physical position of each of the at least one vehicle RF system, each of the at least one trailer RF system, or each of the one independent RF unit system data to maneuver the vehicle or vehicle and trailer to a desired location.

The apparatus further includes: a function of the RF system for marking a point of the desired location or a series of points for a path to the desired, or for marking a point of the undesired location or a series of points of undesired locations for defining a boundary to avoid, and for enabling the vehicle to navigate or maneuver to the desired location or avoid the undesired location. The instructions cause a control system of the vehicle to operate in an autonomous or semi-autonomous mode and to either in an automated or semi-automated manner assist vehicle maneuvers to the desired location. The ecosystem of wireless devices interconnected includes: at least two RF systems, wherein the processor is further configured to determine the relative physical position of two or more of a plurality of RF systems in the ecosystem consisting of the following: each of the at least one of the vehicle RF system, each of the at least one trailer RF system and each of the independent RF unit system by estimating the position of the at least one of the plurality of RF systems relative to at least two of any other RF systems in the ecosystem. The ecosystem of wireless devices interconnected includes: at least two RF systems, wherein the processor is further configured to determine the relative physical position of two or more of a plurality of RF systems in the ecosystem for monitoring a load or a trailer or combination associated thereof wherein the RF systems consisting of the following: one vehicle RF system, one trailer RF system or one independent RF unit system, and each of the at least one vehicle RF system, one trailer RF system or one independent RF unit system. The RF system further includes: at least one or more transceivers for capabilities to transmit data differently than in the extended range capability between each RF system in order to connect with the vehicle, the trailer, or a mobile device.

In yet another embodiment, a method for monitoring and assisting a vehicle and trailer in maneuvers is provided. The method includes: coupling at least a first and second radio frequency (RF) device together in a manner to allow for data exchanges therebetween wherein both the first and second RF device are each configured with a respective ultra-wide band (UWB) transceiver for enabling, using UWB wireless protocols, couplings at extended ranges therebetween. The first and second RF device are associated with a trailer and an entity for monitoring or maneuvering the trailer wherein the entity includes an operator of a vehicle or a vehicle control system, each RF device further includes: generating by a processor disposed locally within each RF device a request for a data packet to send between the first and second RF device to enable a measurement of a distance to be determined between each RF device based on a transmission time of a data packet transmitted back and forth between each RF device; generating a request for location data between each RF device wherein the first RF device sends location data in response thereof and the second RF device receives the location data or vice versa; computing, using algorithmic solutions, one or more measurements from a transmission time ascertained of a sending and a receiving of the location data between each RF device to determine at least a distance between each of RF device which performs the sending and receiving of the location data, and further using measurements ascertained to determine a relative physical position of a trailer associated with at least one of each RF device; and generating data with respect to the measurements and the relative physical position of the vehicle to the entity to cause the trailer to maneuver to a desired location or follow a path to the desired location, or to maneuver in a manner to avoid an undesired location.

The method further includes: configuring the processor to determine the relative physical position of each RF device by estimating the position of more than two of the RF devices corresponding to the trailer, vehicle, and entity. The method includes: marking points by a function of the RF device for the desired location or a series of points for the path to the desired location, or for marking points of the undesired location or a series of points of undesired locations for defining a boundary to avoid, and for enabling the vehicle to navigate or maneuver to the desired location or avoid the undesired location. Additionally, the method includes: transmitting by at least one or more transceivers data in wireless protocols different from the UWB protocol for connecting with a vehicle, a trailer, or a mobile device. The first and second RF devices are associated with a trailer and an entity for monitoring loads associated with the trailer and/or vehicle. Finally, the method includes: instructing, by the data, the entity to operate in an autonomous or semi-autonomous manner to maneuver to the desired location or avoid the undesired location.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

The present disclosure describes an ecosystem of one or more radio frequency devices with ultra-wide band (UWB) transceivers that are paired with similar devices, vehicles, trailers, or other devices to provide data to assist in autonomous, semi-autonomous and operator driven vehicle maneuvers. For example, such devices may be sold as after-markets kits to operators to attach or integrate into legacy vehicles and provide guidance in the operation of a vehicle or a vehicle-trailer combination. Other exemplary embodiments may include integrations with a vehicle and/or trailer as well as wireless connectivity to a respective vehicle, trailer or combination thereof by use of other wireless protocols such as Bluetooth and Wi-fi. In addition, mobile devices such as smart phones may be employed in the ecosystem and paired up with the RF devices to provide data exchanges.

Figure 1:
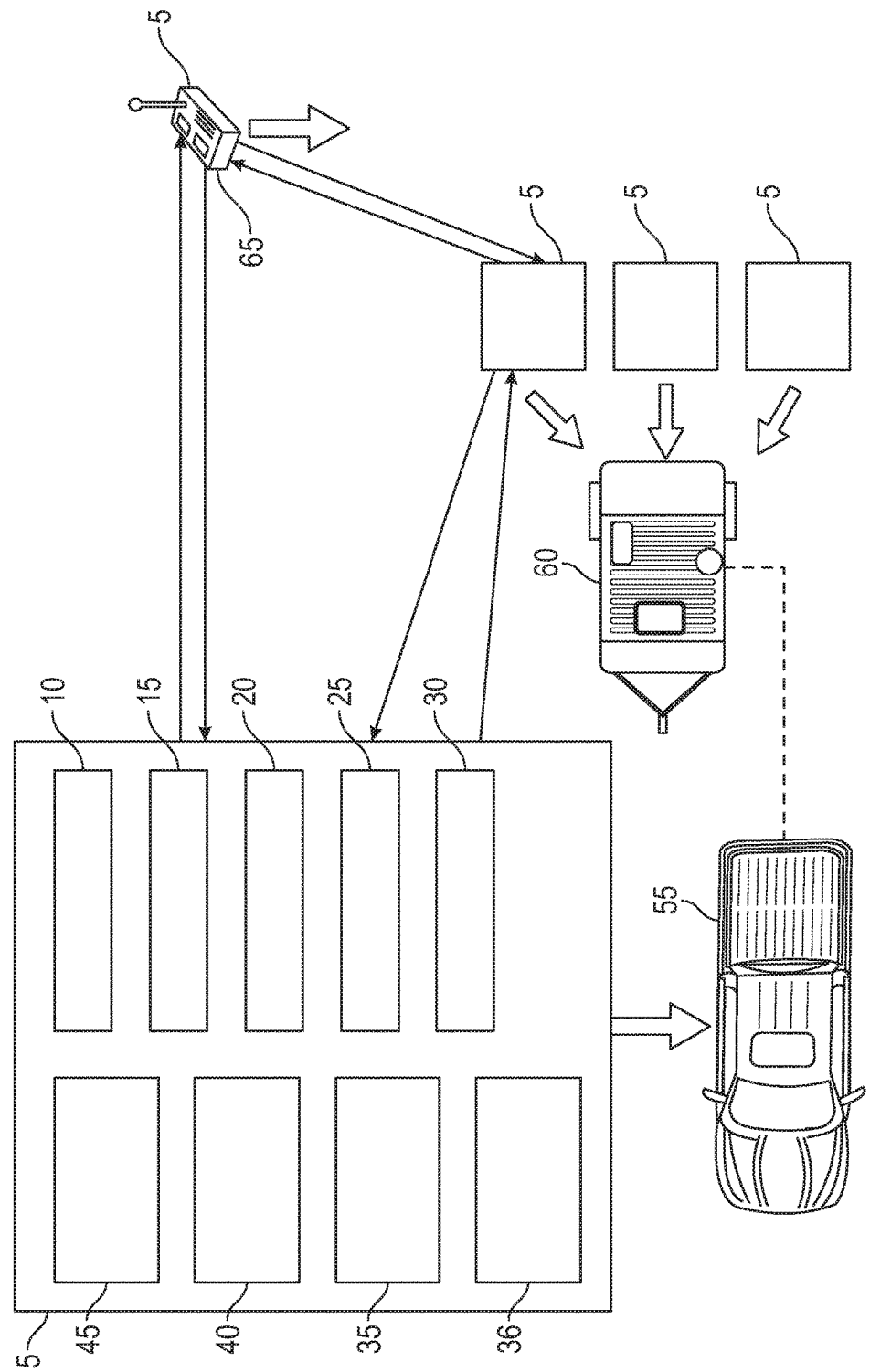
FIG. 1 is a block diagram of an ecosystem of RF devices coupled together in the vehicle and trailer wireless system, in accordance with an embodiment.

FIG. 1 is a block diagram of an ecosystem of RF devices coupled together in the vehicle and trailer wireless system, in accordance with an embodiment. In FIG. 1 there is a block diagram of a wireless RF device 5 which is an independent unit and is part of an ecosystem of one or more similar RF devices 5. In a typical embodiment, the ecosystem may include at least one or more RF devices 5 which communicate between each other unidirectionally or bidirectionally to share data. In the instance of a singular RF device 5, the singular RF device 5 may be configured in primarily in a single mode of functionality with an ultra-wideband (UWB) transceiver. In alternative embodiments, multiple modes of functionality may be equipped by an actuator mode function 45 to provide functionalities that are required to assist in the vehicle or vehicle/trailer maneuver. In a particular instance, the RF device 5 may include at least one ultra-wideband (UWB) transceiver 10 as well as a minimum number of components such as a memory 15 and a power supply 20. In other instances, additional components such as a Wi-Fi transceiver 25, a Bluetooth transceiver 30, a display/notify 40 feature, and an actuator mode function 45 may be included in the RF device 5. For example, when the RF device 5 is integrated in the vehicle 55 other functionalities related to the vehicle may be interfaced such as GPS, actuator modes, etc. as well; there is no need for the RF device 5 to have separate batteries as the power supply of the vehicle 55 can be used. While the present disclosure describes the RF device 5 with multiple different components, it is contemplated that a variety of different component configurations may be used, and further more or less components may be required when the RF device 5 is used in conjunction with the vehicle 55, trailer 60, and/or other devices (not shown). For example, if smart phones are employed with the RF devices 5, the functionalities of the smart phones such as the display and the processing may be used in conjunction or off loaded from the RF device 5. Additionally, a camera and proximity sensors may be incorporated or interfaced into the RF device 5 providing additional data to be sent to the operator or a connected vehicle.

Also, other autonomous and semi-autonomous functionalities may be employed with the RF device 5; for example, in the case of a connected vehicle which employs an autonomous or a semi-autonomous functionality, the connected vehicle by using internal control systems therein can generate commands and may fuse data received from the RF device 5 with sensor data of the connected vehicle. With these generated commands, the connected vehicle may perform maneuvers such as automatically moving the vehicle or vehicle and trailer combination to locations or pathways designated by the RF device 5 or in the alternate to avoid locations or pathways designated by the RF device 5.

In an exemplary embodiment, an RF device 5 may be physically carried by an operator and in a marking operation by use of a function 36 generate data of location or locations as marked points. The marked points may be formed in a manner that allows for one or more segmented marked points with distances in between to be generated or may be formed in a continuous analog type marking manner without any distance therebetween, and these marking operations can be the result of different manipulations of a function 36. In addition, once the marking operation is completed, the operator may proceed to the vehicle 55 and change the mode of operation by use of an actuator mode function 45 such that the RF device 5 may by the display/notify 40 feature provide guidance to the operator as follows: for maneuvering the vehicle 55 to the marked location(s); for maneuvering a combination of the vehicle 55 and trailer 60 to the marked location(s); or for maneuvering individually or a combination of the vehicle 55 and trailer 60 to follow a marked path by a substantially continuous line of marked points. In the alternate, the RF device 5 may provide guidance to the operator as follows: for maneuvering the vehicle 55 in manner around or to avoid particular marked location(s); for maneuvering a combination of the vehicle 55 and trailer 60 around or in a manner to avoid particular marked location(s); or for maneuvering individually or a combination of the vehicle 55 and trailer 60 to not follow a marked path or provide boundaries designated by substantially continuous lines of marked points. These maneuvers may include autonomous or semi-autonomous maneuvers for hitching the trailer 60 to the vehicle 55, for backing up the vehicle 55 with the trailer 60 and include maneuvers for such common tasks such as loading and loading the trailer 60, and a variety of other maneuvers for enhancing vehicle 55 operations with and without the trailer 55; to garner better safety and improved ability to perform such maneuvers especially those requiring a higher degree of operational skill.

The marked points by the RF device 5 may be stored locally or in the cloud by uploading from the RF device 5 to various third party data cloud repositories. Further, location information commonly used such as parking spaces found in parking garages, trailer parks may be downloaded from third party data cloud repository by Wi-Fi, Bluetooth or cellular connectivity as well as the UWB connectivity and may be particularly useful in instances such as at entries of parking garages or other common locations for communications used by the RF device 5 for receiving data and providing instructional guidance. In such instances, it may be necessary to make alignment adjustments for paths to marked points of locations like the parking spaces etc. In an exemplary embodiment, entry points to the locations stored must be aligned to the vehicle so that a vehicle which enters a parking structure if entering at an offset from a marked path, the marked path must be adjusted to correct for the offset. That is, the marked path must be provided with an offset of recalculated points to correct the vehicle direction upon entry to follow a midpoint on a marked path in a manner that diminishes the offset that has occurred at entry. Similarly, the endpoint or in this case the parking location must also be properly aligned for a particular vehicle's size as well as any attached trailer when maneuvering into the parking location. The real-time processing adjustments with respect to the marked path may be performed locally by processors of the RF device 5 by various algorithmic solutions that include taking into account dimensions of the vehicle and trailer as well as breadth of the marked path and the entry and parking location.

For example, the RF device 5 from Wi-Fi or Bluetooth connectivity's may access data from databases, apps or the like of the vehicle 55 connected which may in turn be connected to other third party data cloud repositories, server databases or apps. Further, information may be garnered from these alternative data sources and incorporated into the queues or tabular memories of the RF device 5. That is, alternative data from third parties may be transcoded and re-framed to be processed in appropriate data structures to be used by the RF device 5.

In an exemplary embodiment, the marked points may include packet data of standardized data sets or neutral formats. Additionally, mapping data from third party sites such as various mapping sites can be used to enrich the packet data generated locally by the RF device 5. Data sets of marked points may be mapped to construct virtual arrays of routing information which have been sufficiently enriched to provide instructional guidance and controls for autonomous or semi-autonomous maneuvers with a vehicle 55 and/or a trailer 60 having processing capabilities.

In an alternative embodiment, an additional RF device 5 may be coupled or paired with one or more RF devices 5. For example, one or more RF devices 5 may be attached to a trailer 60 and to the vehicle 55. Further, a third party may even hold or carry an RF device 5 at a location independent to the other RF devices 5 providing guidance information of packet data to an RF device 5 of the operator of the vehicle in a streaming or beacon like manner. In an exemplary embodiment, multiple RF devices 5 would be coupled together at various locations on the trailer 60, at the vehicle 55 and also at a remote location 65. The RF device 5 at the remote location 65 may provide real-time data to the other devices such as range and angle information. Such information may be used by one or more of the devices to performed various algorithmic calculations generating directional and notification information to the operator via the display/notify 40 function. For example, the information generated may be presented in voice or display representations. Additionally, the multiple RF devices 5 may allow for redundancy and overlap in measuring and sensing capabilities. In such cases of overlap or redundancy, comparisons of the marked points can be made by processors of the RF devices 5 reducing the likelihood of failures and false data being generated.

Figure 2:
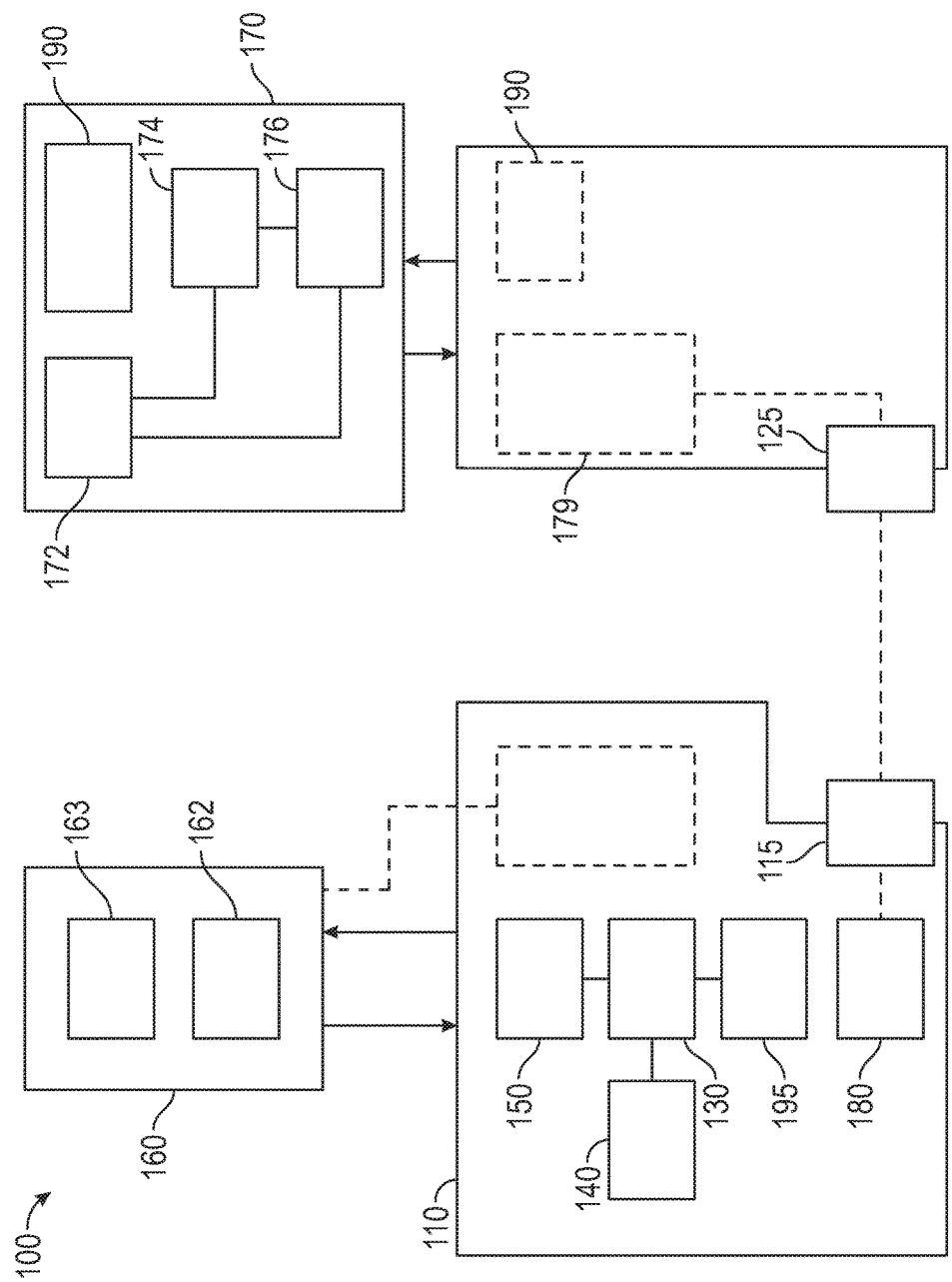
FIG. 2 is a block diagram of a RF devices as a device unit partially integrated or coupled to either the vehicle or trailer of the vehicle and trailer wireless system, in accordance with an embodiment.

FIG. 2 is a block diagram of RF devices configured as a device unit partially integrated or coupled to either the vehicle or trailer of the vehicle and trailer wireless system, in accordance with an embodiment. In the exemplary embodiment, the vehicle 110 includes or is connected to at least one RF device 160. The RF device 160 includes at least one UWB transceiver 162. The RF device 160 may be integrated as part of the vehicle 110 or may be an independent unit wirelessly coupled to the vehicle 110. Further, the RF device 160 may be an independent unit not directly coupled to the vehicle 110 rather connected by via a third-party app hosted at a cloud server. The operator of the vehicle 110 may simply choose or download an app using systems of the vehicle 110 to communicate and operate the RF device 160 or the other RF device 170. The RF device 160 may also be coupled to mobile devices (not shown) of the operator of the vehicle 110. In such, instances, the RF device 160 may be a dual mode or multi-mode device with an UWB transceiver 162 and a Bluetooth or Wi-Fi or combination thereof transceivers (not shown) for coupling with other mobile devices.

The vehicle 110 includes at least one processor 130. The at least one processor 130 in the vehicle 110 may be a central processing unit (CPU), a graphics processing unit (GPU), a physics processing unit (PPU), a microcontroller, a field programmable gate array (FPGA), an application specific integrated circuit (ASIC), or any other logic device, or any combination thereof. The at least one processor 130, hereinafter referred to as a singular "processor 130" for the sake simplicity, may be dedicated to the system 100 or may be shared by one or more other systems in the vehicle 110.

The vehicle 110 further includes one or more vehicle control systems 140. The one or more vehicle control systems 140 may include, but are not limited to, a steering system, a braking system, an acceleration system, a gear selection system, a vision system, an alert system, or the like. As discussed in further detail below, the processor 130 may generate commands for the one or more vehicle control systems 140 in order to automatically move the vehicle 110, for example, into a position such that the vehicle 110 is aligned with the trailer 120 to connect the vehicle hitch 115 to the trailer coupler 125. The vehicle 110 further includes a memory 150. The memory 150 may be any combination of volatile and non-volatile memory. The memory 150 may store non-transitory computer readable instructions for implementing the system 100, as discussed in further detail below.

The RF device 160 may be paired with one or more RF devices forming an ecosystem of similarly coupled RF devices. In such instances, the RF device 160 may communicate independently with at least one other RF device 160 or may communicate with devices not part of the ecosystem. In other instances, the trailer 120 may include at least one RF device 170, the RF device 170 including at least one UWB transceiver 172. Like, the RF device 160 of the vehicle 110, the RF device 170 of the trailer 120 may be an independent device that is attached to the trailer 170. In an exemplary embodiment, the RF device 160 of the vehicle 110 and the RF device 170 of the trailer 120 may exchange data so that the processor 130 of the vehicle can generate the commands to among other things perform maneuvers such as automatically moving the vehicle 110 into a position such that the vehicle 110 is aligned with the trailer 120 to connect the vehicle hitch 115 to the trailer coupler 125. Further, while the RF device 160 and RF device 170 are described with different components, both RF devices may be manufactured with similar components and configured to operate or function differently or function in a manner that either is swappable with the other to assist the operator in maneuvers of the vehicle 110 and trailer 120 combination. Moreover, both RF devices may also be configured to integrate with components of the respective vehicle 110 or trailer 120 to which each is attached.

In one embodiment, for example, one or more of the RF devices 170 on the trailer 120 may be connected to one or more data generators 190. The data generators 190 may be, for example, a camera (e.g., backup cameras, side view cameras, or the like), weight sensors, load position sensors, or the like. When there is available bandwidth between the RF devices 160 and the RF devices 170, the RF devices 170 may transmit the data received from the data generator(s) 190 to the processor 130 through the RF devices 160, thereby allowing the data from the data generators 190 to be wirelessly transferred to the vehicle 110. In alternate embodiments, the RF devices 170 may include cameras, weight sensors, load position sensors or proximity sensors. In other words, there are a number of configurations with different sensors that the RF devices 170 may be configured. Additionally, multiple RF devices 170 may be used in combination and located at various parts of the trailer.

The RF devices 170 could be located in a variety of locations, depending upon the purpose of the respective RF device 170 and the features desired. For example, in one embodiment, only a single RF device 170 could be located on trailer 120 on the trailer coupler 125. As discussed above, having a single RF device 170 in combination with multiple RF devices 160 on the vehicle 110, would allow the processor 130 and vehicle 110 to perform automated hitching alignment or move to a desired location. Having multiple RF devices 170 can improve the accuracy of the automated maneuver by providing ranging data, azimuth data and trailer orientation data.

The RF device(s) 170 may be permanently attached to the trailer 120 or the RF device(s) 170 may be temporarily attached or placed near the trailer 120. For example, an RF device, 170 may be magnetically coupled to the trailer 120 or otherwise attached in any temporary manner. As discussed in further detail below, having multiple RF devices 170 located on the trailer can allow the processor 130 to automatically determine one or more dimension of the trailer 120. For example, having two RF devices 170, one located on a lower portion of the trailer 120 and one on an upper portion, can allow the processor 130 to determine the height of the trailer 120. The height data can be used, for example, by the processor 130 or another system in the vehicle to verify that the trailer can, for example, fit under an overpass or avoid other obstacles such as trees, telephone wires, street signs, or the like. Likewise, having two RF devices 170, one located on a left side of the trailer 120 and one on a left side of the trailer 120, can allow the processor to determine the width of the trailer 120. The width data may also be used for stability and control systems once the trailer 120 is hitched to the vehicle 110. Likewise, having two RF devices 170, one located on a front of the trailer 120 and one on a back of the trailer 120, can allow the processor to determine the length of the trailer 120. The combination of the length, width and height of the trailer may be used by the processor 130, or another system of the vehicle, to assist in any system related to stability and control of the trailer 120 once hitched to the vehicle 110. The number of RF devices 170 arranged on the trailer 120, and their respective placement, can vary depending upon the desired features, that is, automated hitching alignment, width determination, height determination, length determination, or any combination thereof. Alternatively, as discussed above, one or more mobile RF devices 170 may be temporarily attached to the trailer 120 to determine the respective dimensions of the trailer 120. By utilizing one or more mobile RF devices 170, which are temporarily attached or held near a respective corner of the trailer 120, the processor 130 can determine the dimensions of any trailer without having to permanently install the RF devices 170 thereon. Likewise, the processor 130 can perform the automated hitching utilizing the mobile type of RF device (s) 170.

A total number of combined RF devices 160 and 170 in the system 100 is preferably greater than or equal to three for the purposes of automatically moving the vehicle 110 into position to be hitched to the trailer 120, as three points allow for triangulation calculations, as discussed in further detail below. In one embodiment with three total RF devices 160 and 170, the system may include two RF devices 160 on the bumper of the vehicle and one RF device 170 may be located on the trailer coupler 125. In another embodiment, for example, two RF devices 170 may be located on a front of the trailer 120 and one RF device 160 may be located on the vehicle hitch 115. However, more RF devices 160 or 170 placed on the respective vehicle 110 or trailer 120, give more data points, thereby improving the accuracy of the system 100. For example, having four RF devices 160 and 170 in total would allow the processor 130 to calculate a relative azimuth of all of the devices allowing for both ranging and azimuth calculations when the RF devices 170 are along the same plane and a relative height of the RF devices 170 and 160 are known. In contrast, only having three RF devices 160 and 170 in total would only allow for ranging calculations and a user may have to manually enter height information of any RF device 170 on the trailer into the system to more accurately perform the automated hitching or trailer dimensioning.

In one embodiment, for example, the location of the RF devices 160 may be stored in the memory 150. The location data may be stored in the memory 150 by, for example, the vehicle manufacturer when the RF devices 160 are installed when the vehicle 110 is being built. However, the location data may be added to the memory 150 at a later time. For example, one or more of the RF devices 160 may be added as an aftermarket product. In these embodiments, the location data may be generated by using a mobile hand-held type of RF device 170 placed on the vehicle hitch 115 of the vehicle 110. In this embodiment, for example, the processor 130 would determine a relative location of the aftermarket RF devices 160 utilizing a similar ranging processes, as discussed in further detail below. Alternatively, a user could measure the distance between each aftermarket RF device 160 and the vehicle hitch 115 and enter the distances in each plane into the system using an element of the user interface 195. If a user manually hitches the vehicle 110 to the trailer 120, the processor 130 could determine the location of the trailer coupler 125 relative to the location of the RF device 170 and store the respective locations in the memory for future automated maneuver operations.

Each RF device 170 may have a unique identifier associated therewith. The unique identifier may be associated with a location on the trailer 120 relative to the trailer coupler 125 by the user using the user interface 195. In this manner, the processor 130 can identify an orientation of the trailer 120, when more than one RF device 170 is used, and can properly identify the location of the trailer coupler 125 for the automated maneuver process.

Returning to FIG. 2, in one embodiment, for example, the RF device 160 of the vehicle 110 may include another transceiver such as a Bluetooth transceiver, a Wi-Fi transceiver, a ZigBee transceiver, or the like or any combination thereof. In this embodiment, an UWB transceiver 162 may be utilized to exchange data with the RF device 170 of the trailer 120 and the other transceiver may be used to wirelessly communicate with the processor 130, which would be connected to another. However, in other embodiments, each RF device 160 may be communicatively connected to the processor via a wired data bus. Any combination of wired or wireless systems may be used to connect the RF device(s) 160 to the processor 130.

The RF device(s) 170 of the trailer 120 further includes a processor 174. The processor 174 may be a central processing unit (CPU), a graphics processing unit (GPU), a physics processing unit (PPU), a microcontroller, a field programmable gate array (FPGA), an application specific integrated circuit (ASIC), or any other logic device, or any combination thereof. The processor 174 controls the RF device 170 of the trailer 120, as discussed in further detail below.

The RF device(s) 170 of the trailer 120 further includes a power system 176. The power system 176 may include a battery powered system. The battery power system allows the RF device(s) of the trailer 120 to operate when the trailer 120 is not connected to the vehicle 110. The power system 176 of the trailer may also be capable of receiving power from a power system 180 of the vehicle 110 when the trailer 120 is hitched to the vehicle 110. Trailers 120 often receive power from a vehicle 110 through a harness (not illustrated) in order to power brake lights on the trailer. Accordingly, the RF device 170 of the trailer 120 may utilize this power source when the trailer 120 is hitched to the vehicle 110 in order to reduce the power consumed by the batteries of the power system 176 as well as provide charging to any onboard batteries.

The vehicle 110 may further include a user interface 195. The user interface 195 may include one or more buttons, a display, a touchscreen, a knob, a joystick, a mouse, a microphone, or the like, or any combination thereof. The user interface 195 may be used to initiate the system 100, select a mode of operation for the system 100, and/or display system data, as discussed in further detail below.

Figure 3:
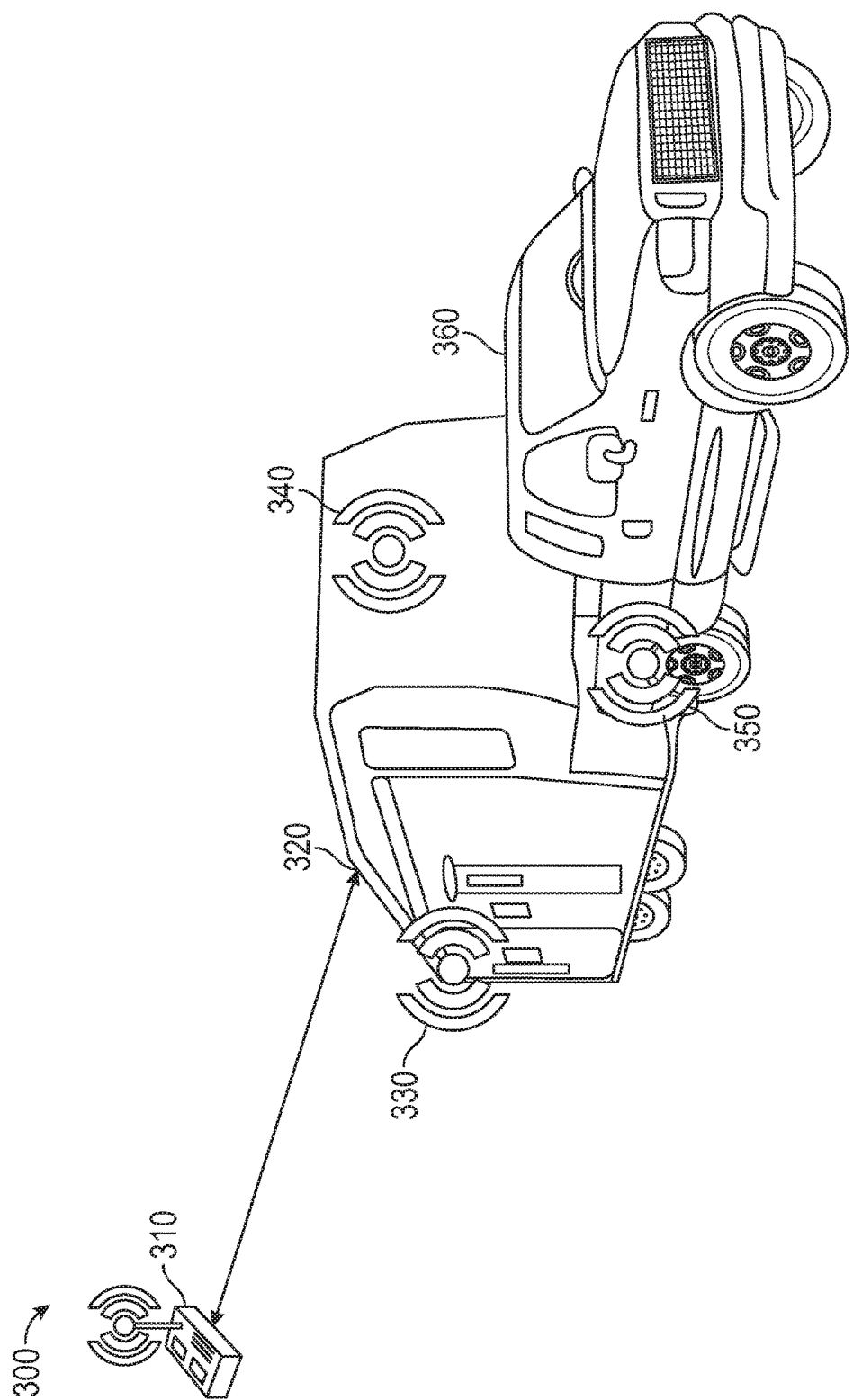
FIG. 3 is a diagram of a RF device remote to and RF devices attached to a vehicle and trailer in the vehicle trailer wireless system, in accordance with an embodiment.

FIG. 3 is a diagram of a RF device remote to and RF devices attached to a vehicle and trailer in the vehicle trailer wireless system, in accordance with an embodiment. The RF device 310 is independent of the trailer 320. That is, the RF device 310 is at a location marking a position where the trailer 320 is to be maneuvered too. In an exemplary embodiment, the RF device 310 may encompass locations for the trailer 320 such as for parking, for loading/unloading, for following prescribed points or paths, for navigating past obstacles etc. For example, an operator of a trailer 320 may desire that the trailer be maneuvered to a particular location in a parking garage or the like. The user may simple physically carry the RF device 310 to a location of choice. The RF device 310 upon actuation by the operator would mark the location. In a particular instance, the operator may mark the location by pressing a button on the RF device 310 generating a signal to the other RF devices 330, 340, and 350 located at the trailer 320 or vehicle 360 or to a combination of the trailer 320 and vehicle 360.

In addition, the RF device 310 may be placed in the vehicle 360 so that the vehicle operator can monitor the trailer 320. That is, the RF device 310 serves as a link to monitor distance and load of the trailer 320. For example, one of the other RF devices 330, 340 or 350 may be attached to a load on the trailer and/or placed in the vicinity thereto. The operator on the vehicle 360 would be able to monitor the load by data received from the RF device attached and/or in vicinity thereof. If the load were to move, corresponding data would be generated from the RF device attached and/or in the vicinity thereof and sent to vehicle 360 or another RF device 310 that is placed in the vehicle and the operator would be notified. Likewise, a similar process could be used if for example the vehicle 360 was a pickup truck and carrying a load. The RF device 310 may be affixed to the load and/or may simply be affixed in the vicinity of the load and use sensor data such as from proximity sensors included in the RF device 310 at the load to monitor the load.

In an exemplary embodiment, the RF devices 330, 340, 350 may be attached to machinery such as construction equipment. An operator or operator(s) each with a respective RF device 310, 330, 340 and 350 could monitor the other construction equipment and be issued notifications if a collision approaching or another construction equipment is nearby by setting various thresholds for notifications. These thresholds may include the distances between RF devices 310, 330, 340 and 350, the directional movement of RF devices 310, 330, 340 and 350 etc. In other words, given the ability to determine locations, angles of approach and distances therebetween, the RF devices 310, 330, 340 and 350 may be useful in other ways when monitoring of equipment are necessary and the RF devices 310, 330, 340 and 350 are within range of each other to communicate data.

In alternate embodiments, the signals generated may simply be received at the vehicle 360 by RF devices 330, 340 and 350 attached to the vehicle. For operation, in an exemplary example, there is at least one RF device 310 independent of the vehicle 360 or trailer 320 or combination of both at a location remote to the vehicle 360 and trailer 320. There is also at least one other RF device 310 coupled or attached to the vehicle 360 or trailer 320. As another alternate exemplary example, the remote RF device 310 may be temporarily positioned at the remote or desired location and the location marked by the RF device 310 and then the RF device 310 positioned with the operator of the vehicle 360 while the operator performs the maneuver. That is, with multi-functionality built-in, only one RF device 310 operating in multi-modes may also serve the purpose by retaining the desired location in memory once marked and also assisting the operator of the vehicle 360. In an exemplary embodiment, it is envisioned that there at least two mutually separate RF devices 310 which may be paired to communicate between each other. That is, one of the two RF devices 310 and the other RF device 340 as an example would be coupled by UWB signal communication protocols and exchange information of marked points from one to the other RF device 310 or 340. The data generated by the RF device 310 of locations may be segmented or continuous of location points. That is, an operator may actuate a button on the RF device 310 in a repeated manner to generate marked points at various locations by physically moving to each location or may simply generated a continuous line or path of marks by a manipulation of an actuator (not shown) of the RF device 310. Additionally, the RF signals which are UWB signals may be used due to the extended range capabilities for conducting measurements of ranges from a point of interest or desired location to the other RF devices 330, 340 and 350 or systems (not shown) of vehicles 360 as will be explain in more detail and may even be considered a primary function when using the RF devices 310, 330, 340, and 350.

In an exemplary embodiment, the systems (not shown) of the vehicle 360 may be coupled and collect and store the marked points directly for conducting measurements of ranges from a point of interest or desired location. That is, the RF devices 310, 330, 340 and 350 can act like as additional sensors, transmitters or data collectors of location data or of the marked points, send this data in direct parallel distribution to the systems of the vehicle 360 and the processing can occur within the systems of the vehicle 360 by the direct interfacing and wireless connection to the vehicle 360 systems. In addition, the additional data, location, range measurements etc. collected from the RF devices 310, 330, 340 and 350 can be fused into sensor data and used in conjunction with the sensor data of other sensor systems in the vehicle 360 in autonomous and semi-autonomous vehicle operations. That is, the vehicle may have data derived from LIDAR, radar, and image sensors and processing systems and the additional data from the RF devices 310, 330, 340 and 350 may be incorporated or provide redundancy for safety checks etc. In addition, because of the extended range capabilities of the RF signals, measurements of ranges from a point of interest or desired location of the RF devices 310, 330, 340 and 350 can be conducted at greater or extended ranges. Hence, the systems of the vehicles may receive data generated from these RF devices 310, 330, 340 and 350 at a greater range than is customary the case for conventional RF transceiver devices, where the reception area of the RF signals of UWB transceivers allows for receptions of very wider angles and longer ranges and of a higher degree of integrity especially when used in complicated environments. Typically, such ranges may be in the range of approximately 250 meters or so. For example, if at least one RF device 310 independent of the vehicle 360 or trailer 320 or combination of both may be placed at locations of greater distances and at very wide angles than non-UWB transceiver devices and still allow for transmissions at precise measurements from the RF device 310 to the vehicle 360 and trailer 320. Hence, better safety and assist guidance may be provided by the extended range capabilities to the UWB transceivers and this data can be directly received by systems of the vehicles.

In an exemplary embodiment, the systems (not shown) of the vehicle 360 may be coupled and collect and store marked points for locations to avoid or boundaries formed by marked points not to cross when navigating to desired locations. For example, such locations or boundaries may be formed and include hazardous objects, roadworks, temporary maintenance zones etc. For example, in parking garages undesired locations or undesired marked paths may include paths that lead to lower garage heights in parking garages or narrower parking spots. Hence, the RF devices 310, 330, 340 and 350 may operate in a manner to mark such points to avoid and create boundaries in paths by these marked points of avoidance and further the systems of the vehicle 360 may conduct measurements of ranges and solutions to avoid these undesired locations and may even be enabled to plot paths to the point of interest or desired location in paths that avoid the undesired locations and follow the designated boundaries by the undesired marked points.

Figure 4:
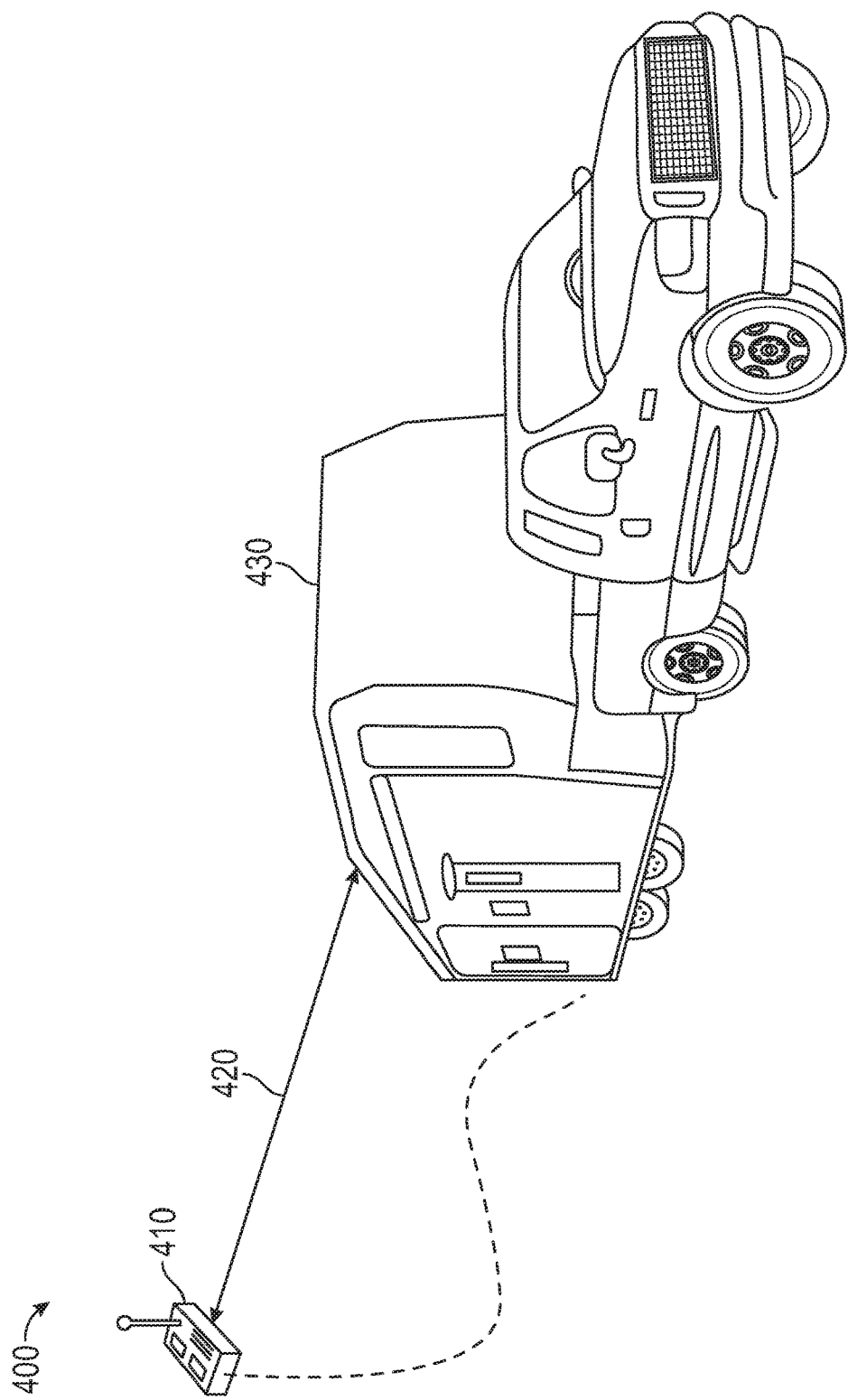
FIG. 4 is a diagram of a RF device remote to vehicle and trailer in a vehicle and trailer wireless system, in accordance with an embodiment.

FIG. 4 is a diagram of a RF device remote to vehicle and trailer in a vehicle and trailer wireless system, in accordance with an embodiment. The RF device 410 is wirelessly connected and is positioned at a desired location. A command is sent via a wireless protocol to the vehicle and trailer combination 430. A set of measurements may be conducted at 420 by the communication from the RF device 410 to the vehicle and trailer combination 430. The measurements may include assessing the distance and azimuth of the RF device 410. The vehicle and trailer combination 430 during a maneuver are kept within a safe range, that is a range where the measurements have a certain degree of accuracy as determined through empirical testing. This may be indicated by an indicator (not shown) on the RF device 410 showing the strength and range for the signal generated from RF device 410 and subsequent receiver capability if bi-directional communication is occurring. The vehicle and trailer combination 430 calculates the maneuvers according to various parameters such as the trailer size, trailer wheels, and vehicle dimensions. In an exemplary embodiment, the parameter information of various trailers may be locally stored by the RF device 410 in memory and by inputting the trailer model, the various parameters can be automatically retrieved via lookup tables or virtual tables in the memory or from databases connected by the cloud.

Figure 5:
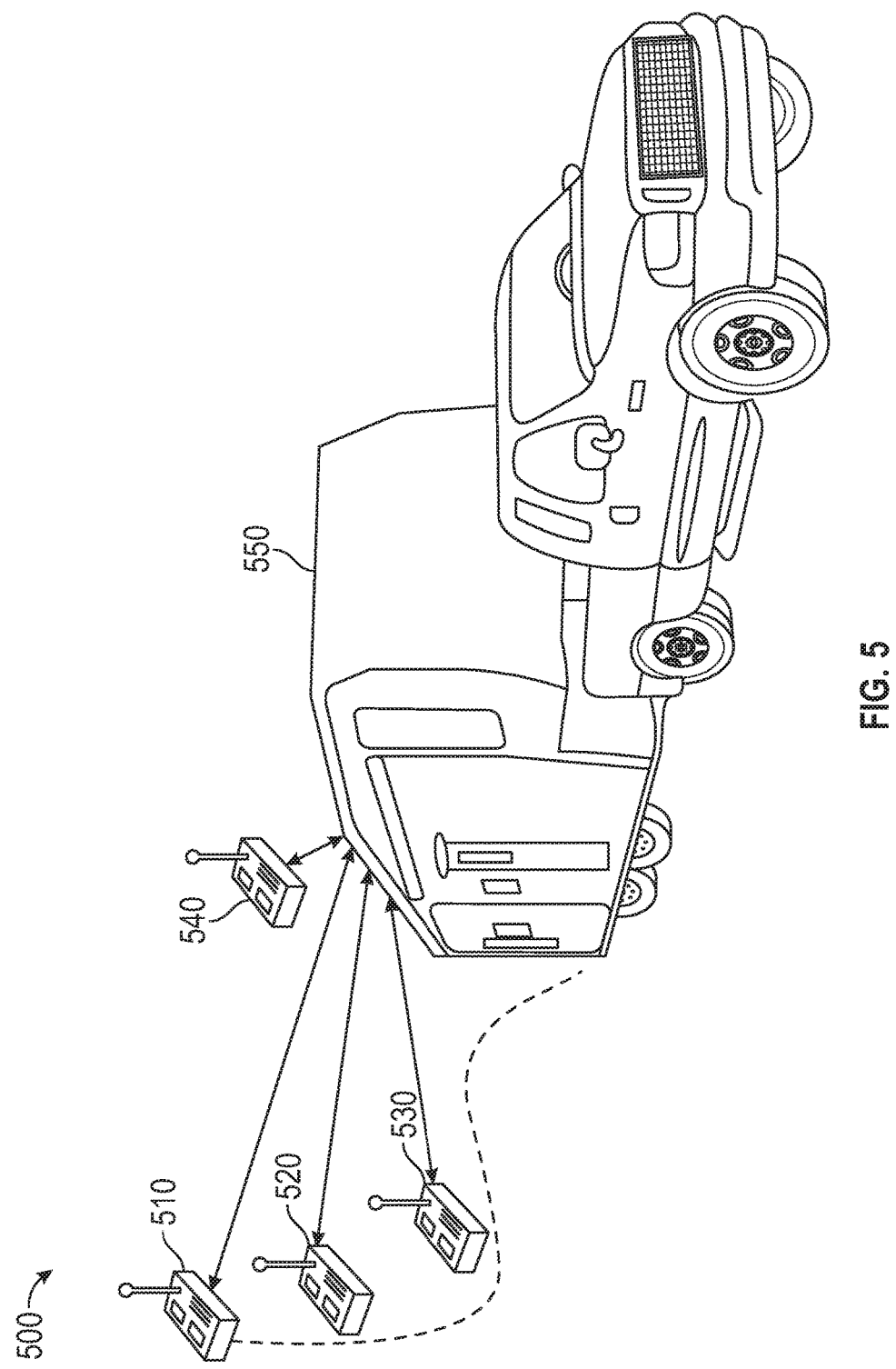
FIG. 5 is a diagram of a RF device defining a path for a vehicle and trailer in a vehicle and trailer wireless system, in accordance with an embodiment.

FIG. 5 is a diagram of a RF device defining a path for a vehicle and trailer in a vehicle and trailer wireless system, in accordance with an embodiment. FIG. 5 shows a path diagram 500 of a single RF device in locations 510, 520, 530 and 540. In the exemplary embodiment, the operator when the RF device is positioned in the location 510 which is the final location desired, presses an actuator button (not shown) and sends a command to the trailer and vehicle combination indicating the final location. The command generated includes packet data that has location information of multiple locations beginning with 540 and proceeding in a non-linear path to location 530, then to location 520 and eventually to the location 510 as illustrated by FIG. 5. While the operator is moving with the RF device to each of the locations 540, 530, 520 and 510, the RF device is capturing measurements and ranges which are collected by the vehicle and trailer in combination or individually and processed for vehicle maneuvers. In the case of a connected vehicle with autonomous capabilities, the operator may simply walk by a path that the operator desired the vehicle to follow and actuate the function at the desired final location 510. The autonomous vehicle would process the data by the command generated and maneuver the vehicle 550 in an automated manner to the desired location of location 510. In an assist operation, the operator would carry the RF device after walking and marking the locations, back to the vehicle and operate the vehicle 550 while receiving instructions from the RF device. In another example of a semi-autonomous operation, the control systems of the vehicle 550 would receive the command from the RF device and generate information to provide instructions to operator to assist in maneuvering the vehicle 550 to location 510.

Figure 6:
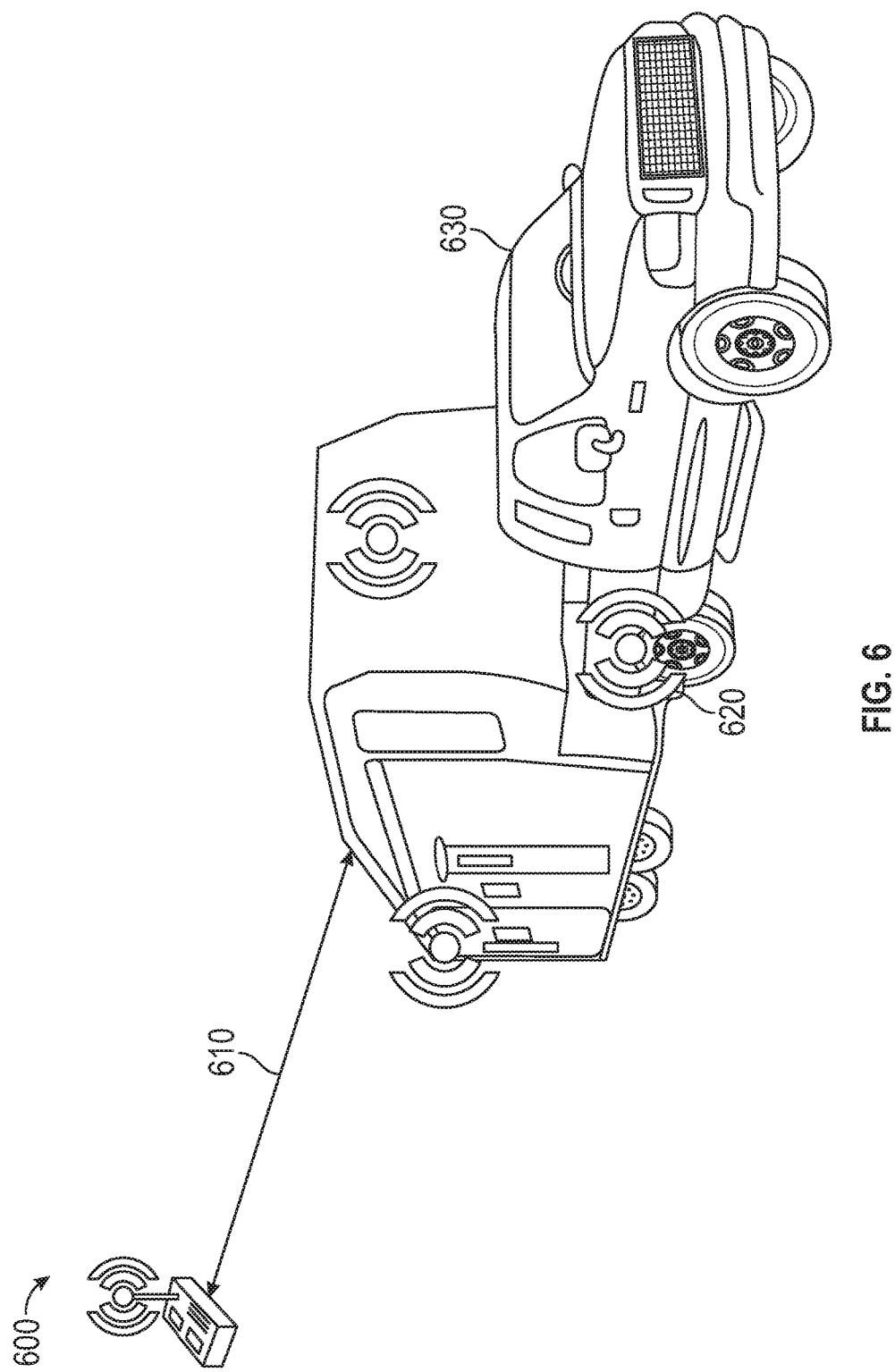
FIG. 6 is a diagram of a RF device remote coupled to several RF devices attached to a vehicle and trailer in a vehicle and trailer wireless system, in accordance with an embodiment.

FIG. 6 is a diagram of a RF device remote coupled to several RF devices attached to a vehicle and trailer in a vehicle and trailer wireless system, in accordance with an embodiment. The wireless system includes an external RF device 600 which is coupled to multiple RF devices 620 communicating via an UWB link 610. The UWB link is used to conduct ranging measurements. In the exemplary embodiment, the wireless system has more than three RF devices for the purposes of automatically moving the vehicle into position to a pre-determined position. With the three RF devices 620 attached to the trailer and vehicle combination 630, the three points allow for triangulation calculations, as discussed in further detail below. In one embodiment with three total RF devices, the system may include two RF devices 620 on the trailer and one RF device 620 may be located on the trailer coupler. The greater the number of RF devices 620 placed on the respective trailer or vehicle the more data points are generated the accuracy of the wireless system is improved. For example, having four RF devices 620 in total would allow the processor to calculate a relative azimuth of all of the sensors of the RF devices 620 allowing for both ranging and azimuth calculations when the RF devices 620 are along the same plane and a relative height of the RF devices are known. In contrast, only having three RF devices 620 in total would only allow for ranging calculations and an operator may have to manually enter height information of any RF device 620 on the trailer into the system to more accurately perform the trailer maneuvers.

Further, data collected from the RF devices 620 about the trailer may be used or linked to mapping information from third party databases when navigating particular routes to provide warnings. For example, when trailer heights or weights discerned from data from the RF devices 620 is greater than is allowable for safe passage of the trailer for a tunnel, bridge or other obstacle on the navigated route, automated warnings could be issued by the RF devices prior to the navigation or when actually navigating a particular route.

Figure 7:
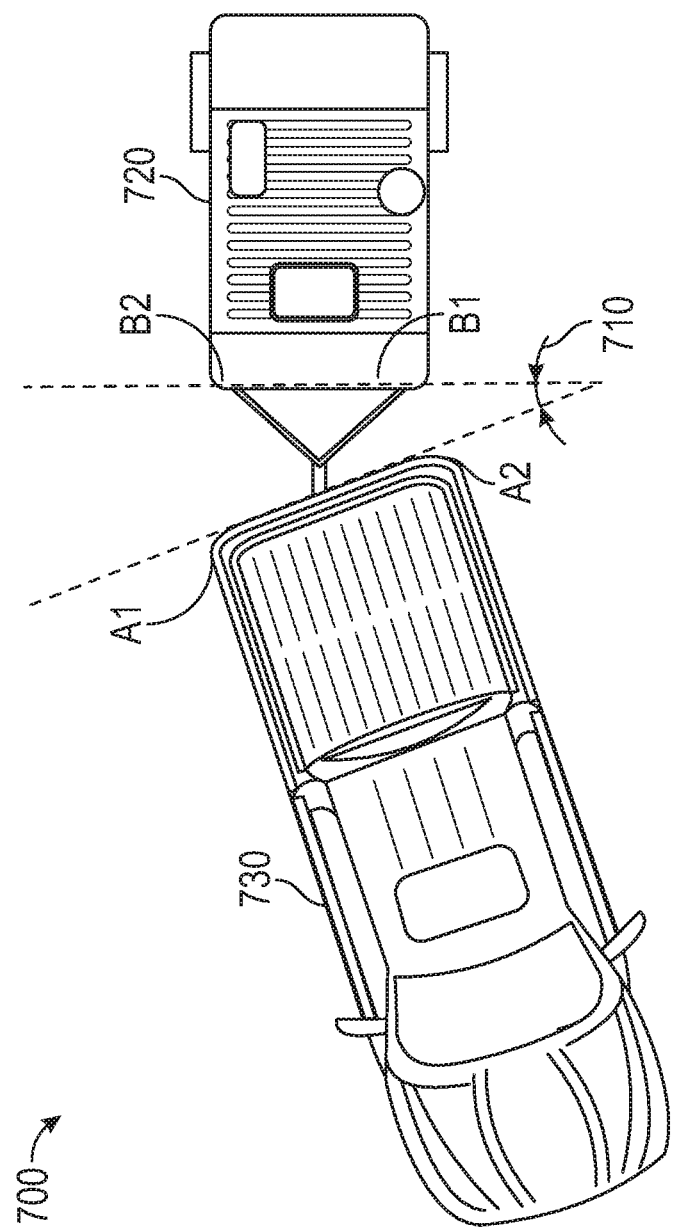
FIG. 7 is a diagram of an RF device used when performing a maneuver of the vehicle and trailer in the vehicle and trailer wireless system, in accordance with an embodiment.

FIG. 7 is a diagram of an RF device used when performing a maneuver of the vehicle and trailer in the vehicle and trailer wireless system, in accordance with an embodiment. The wireless system during backing the system will continuously monitoring the angle 710 between trailer and the vehicle. That is, the wireless system by the continuous monitoring of the vehicle will send appropriate commands to perform a maneuver while considering the angle of the trailer and the vehicle. If the angle 710 is greater than a predetermined amount for the type of trailer and vehicle, then commands will be generated to enable the vehicle to perform stabilizing maneuvers to prevent a jack-knifing of the trailer to the vehicle. Also, monitoring of the angle 710 can be performed in real-time or over time to predict other dangerous conditions such as swaying of the trailer or other potentially risky trailer movements. Further, appropriate commands or notifications may be generated to prevent or lessen the impact of such adverse or dangerous conditions from happening to the trailer and vehicle and again provide information about maneuvers to the vehicle to stabilize the condition in advance of the adverse condition actually happening. In other words, the wireless system by using data generated from the RF devices placed on the trailer, the vehicle or combination thereof and the maneuvers of the vehicle and trailer combination, will by various algorithmic computations, make conjectures of the likelihood of approaching an angle that will cause both the trailer and the vehicle to sway, jack-knife or make other hazardous movements and issue commands or warnings indicating the likelihood and make changes in real-time of the vehicle and trailer combination movement to prevent a sway, jack-knife or other hazardous movement from occurring.

For example, to make the angle determinations in FIG. 7, two RF devices (not shown) may be employed in pairs on the vehicle and the trailer. As seen in FIG. 7, two RF devices may be labeled A1 and A2, and two RF devices maybe labeled B1 and B2, are installed, attached or used in the vehicle 730 and trailer 720, respectively. In this example, a processor of any of the RF devices A1-A2 or B1-B2 or the vehicle first determines an origin for a frame of reference for the position calculations. The origin, for example, could be the location of one of one of the RF devices A1 or A2 on the vehicle 730. However, the location of any of the RF devices could be used as the origin point for the purposes of the position calculations. In another embodiment, and as illustrated in FIG. 7, the origin for the frame of reference could be set to be in the middle of the RF device A1 and A2 on the vehicle 730. In yet another embodiment, the origin may be a location of a hitch of the vehicle 730. However, the origin for the frame of reference could be set to be anywhere in the middle of two or more RF devices A1-A2 or B1-B2 of the vehicle and trailer. In another embodiment, for example, the origin can be preselected and saved on the memory of any of the RF devices.

The selection origin affects the triangulation calculations. For example, with the origin between RF devices A1 and A2 as seen in FIG. 7, the processor calculates the position of RF devices A1 and A2 according to $P_{A1}=(-D_{A1A2}/2, 0)$ and $P_{A2}=(D_{A1A2}/2, 0)$, where $P_{A1}$ corresponds to the position of RF device A1, $P_{A2}$ corresponds to the position of RF device A2 and $D_{A1A2}$ corresponds to the distance between RF device A1 and RF device A2. In this embodiment, the angle between RF device A1 and RF device B1 $\theta_{A1B1}$ may be determined according to:

$$\theta_{A1B1} = a\cos\left(\frac{D_{A1A2}^2 + D_{A1B1}^2 - D_{A2B1}^2}{2 \times D_{A1A2} \times D_{A1B1}}\right)$$

In this embodiment, the angle between RF device A1 and RF device B2 $\theta_{A1B2}$ may be determined according to:

$$\theta_{A1B2} = a\cos\left(\frac{D_{A1A2}^2 + D_{A1B2}^2 - D_{A2B2}^2}{2 \times D_{A1A2} \times D_{A1B2}}\right)$$

Where $D_{xy}$ represents the distance between the named RF devices calculated by the processor. With the distances between the respective points and the angles therebetween, the processor can calculate the position of RF device B1 ($P_{B1}$) and the position of RF device B2 ($P_{B2}$) according to:

$$P_{B1}=P_{A1}+D_{A1B1}(\cos(\theta_{A1B1}), \sin(\theta_{A1B1}))$$

$$P_{B2}=P_{A1}+D_{A1B2}(\cos(\theta_{A1B2}), \sin(\theta_{A1B2}))$$

The example set forth in FIG. 7, and the equations above, are merely exemplary in nature as the selected origin as well as the number of dimensions and the number of RF devices may vary (e.g., two dimensional equations are only needed when the RF devices are the same elevation above the ground and three-dimensional equations would be used when the elevation of the RF devices varies). In addition, other positional estimation methods may be employed aside from the two and three-dimensional equations to make angle determinations, dimension calculations aside from the triangulation based calculations.

Figure 8:
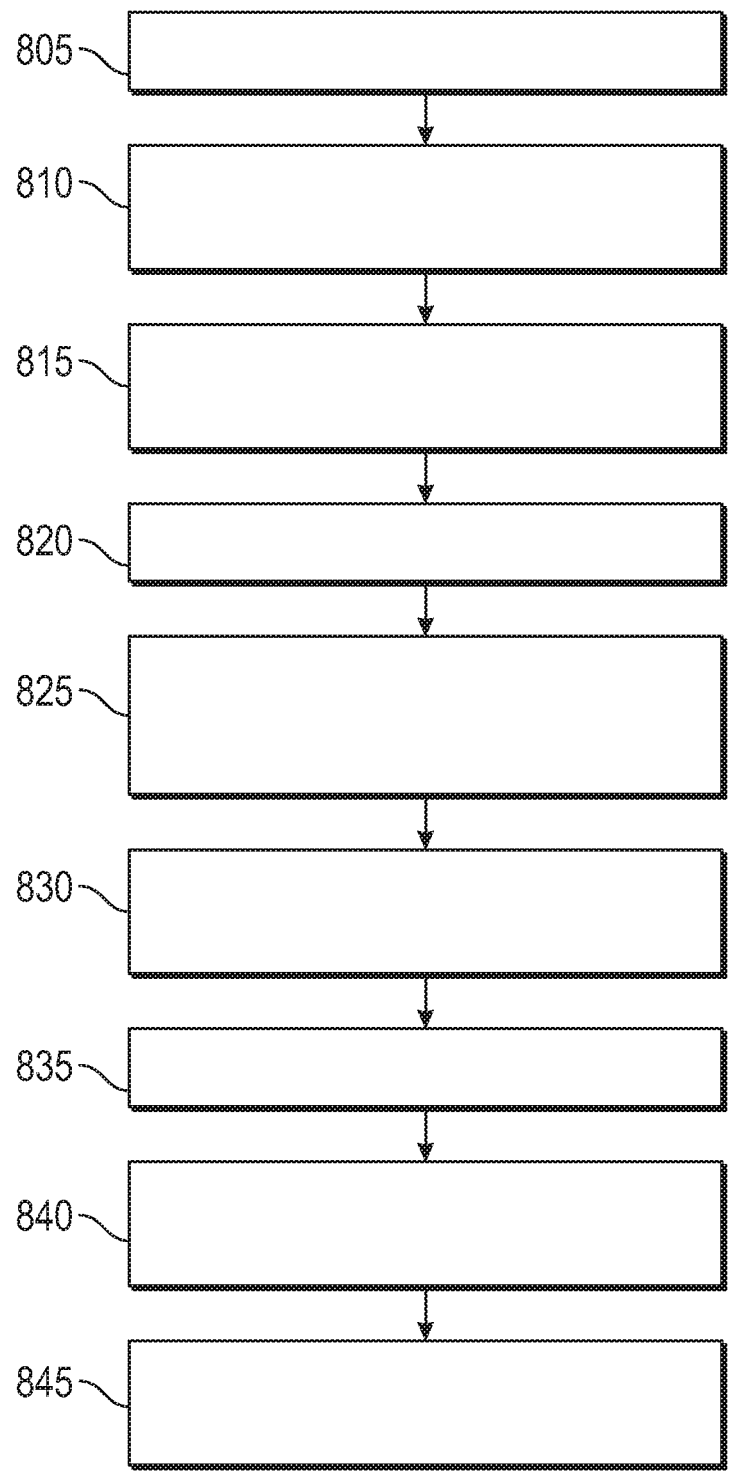
FIG. 8 is a flowchart of the operation of the RF devices when performing a maneuver of the vehicle and trailer in the vehicle and trailer wireless system, in accordance with an embodiment.

FIG. 8 is a flowchart of the operation of the RF devices when performing a maneuver of the vehicle and trailer in the vehicle and trailer wireless system, in accordance with an embodiment. Initially, RF devices are attached to the vehicle and trailer at various locations on both conveyances (Step 805). Then an RF device is physically carried to a particular location by an operator (Step 810). The RF device may while being carried generate marked points along the pathway or simply generate a marked point at the final location desired for placement of the trailer of the vehicle trailer combination (Step 815). The RF device generates data packets of the marked point to be sent to the vehicle or an RF device at the vehicle. Each data packet includes a unique identification code associated with a respective RF device. The unique identification codes are used to track responses from the RF devices. The unique ID may be assigned by a processor or may be built into the transceiver of the RF device. Each unique ID is associated with the location of a respective RF device relative to a location of the trailer or vehicle or combination thereof.

Further, the processor of the RF device or vehicle may also generate instructions causing the RF devices on the vehicle to transmit data packet in response. (Step 820). In one embodiment, for example, each RF device may take turns conducting the ranging measurements. By only having a round-robin process of each RF device transmitting the data packet at a time, each other RF device can respond as quickly as possible (i.e., the other RF devices won't be processing other requests), thereby increasing the accuracy of the time-of-flight ranging measurements.

The processor of the RF devices receives the packet sent by other RF devices or the vehicle and retransmits the packet along with unique ID of the respective RF device for receipt by the other RF device(s) (Step 825). The data packets are retransmitted with a unique ID corresponding to each RF device so that data corresponding to the same RF device received by different RF devices can be used to estimate the position of the RF device. The respective positions, and distances there between, of any of the RF devices on the vehicle may be stored in the memory either locally or remotely. However, the RF devices could also respond to data packets received from other RF devices in a similar manner as the RF devices used to determine the relative locations between the RF devices.

A processor then processes the data received at each RF device to determine the distance between of each of the RF devices relative to the other RF devices. (Step 830). In one embodiment, for example, the processor may perform all of the processing. However, in another embodiment, for example, each RF device may have an internal processor for localized processing. In this embodiment, for example, the processor of the RF device may determine the distance between the respective RF device and each RF device and transmit the distances to the processor for subsequent processing. In either embodiment, the distance between each respective RF device is determined based upon a time of flight of the transmitted data packets. In one embodiment, for example, the data packet may be sent with a time stamp. In another embodiment, for example, the processor may store a timestamp in the memory. However, any combination of timestamp mechanism may be used. The processor determines the distance between each RF devices based upon a time of flight, in other words, the difference in time between when the packet was sent by the RF device and when the packet was returned without a delay between the reception and transmission by the corresponding RF device.

The processor then determines the position of each RF device based upon the determined distances between each RF device (Step 835). By determining the position of each RF device, the processor is able to perform the maneuver of the vehicle and trailer, as well as determine the dimension of a trailer, or both. In one embodiment, for example, the processor may determine the position of each RF device via triangulation.

The processor depending upon the mode of operation determines one of a maneuver of the vehicle, an alignment of the trailer, a trailer weight, movement of a trailer or load of a trailer, maneuver of the trailer and vehicle and a trailer dimension, or both (Step 840). In the case of the trailer dimensioning, the processor utilizes the determined position of the RF device(s) on the trailer to determine the dimensions of the trailer. A like process can be applied in conjunction with additional data about the trailer such as technical details about the trailer suspension and weight unloaded, and by measuring the differences in the determined position from the original position of the trailer to determine the weight of a loaded trailer.

When the system is operating in the maneuver mode, the processor determines control commands for the vehicle control system(s) to maneuver the vehicle with the trailer based upon the relative locations of the vehicle and the trailer to the final destination or path to be followed. Once the position of the vehicle and trailer is determined, the processor generates commands to the control systems to maneuver the vehicle and trailer into position such that the trailer is aligned with the location desired. The processor generates instructions to move the vehicle based on the relative location and position of the trailer and the location desired and continues to conduct measurements constantly. The processor controls the peed of the vehicle, especially in close range, to enable the collection of sufficient measurements to ensure high accuracy. In another embodiment, for example, the processor may generate commands for the user to implement to align the vehicle hitch with the trailer coupler based upon the relative locations of the vehicle hitch ball, the trailer coupler and the RF device(s). The generated commands may be displayed, for example, on a display of the user interface or the RF device located with the operator. The generated commands could include, for example, steering wheel angles, distances to travel and the like, which when executed by the user, align the vehicle and trailer to the desired location. In either embodiment, the processor continuously updates the vehicle control commands or user commands (i.e., the processor goes through the steps of the method multiple times) as the vehicle and trailer progress towards the desired location.

The processor may also process the data and may execute one or more actions depending upon the data received and the data generator type (Step 845). For example, if the data generator is a back-up camera, the processor may generate instructions to display the camera data on a display within the vehicle. The processor could also process the camera data to determine, for example, if there are any pedestrians or other objects behind the trailer.

While at least one exemplary aspect has been presented in the foregoing detailed description of the invention, it should be appreciated that a vast number of variations exist. It should also be appreciated that the exemplary aspect or exemplary aspects are only examples, and are not intended to limit the scope, applicability, or configuration of the invention in any way. Rather, the foregoing detailed description will provide those skilled in the art with a convenient road map for implementing an exemplary aspect of the invention. It being understood that various changes may be made in the function and arrangement of elements described in an exemplary aspect without departing from the scope of the invention as set forth in the appended claims.

What is claimed is:

1. A system for communicating data between a plurality of wireless devices for assisting a vehicle and trailer in various maneuvers, comprising:

at least a first and second radio frequency (RF) device attached or positioned with a vehicle, trailer and/or a desired location and coupled together in a manner to allow for data exchanges therebetween wherein both the first and second RF device are each configured with a respective ultra-wide band (UWB) transceiver for enabling, using UWB wireless protocols, couplings at extended ranges therebetween, each RF device further comprises:

a processor locally disposed within each RF device for generating data packet for sending between the first and second RF device to enable a measurement of a distance to be determined between each device based on a transmission time of a data packet transmitted back and forth between each RF device, the processor configured to:

generate a request for message data between RF devices wherein the first RF device sends message data in response thereof and the second RF device receives the message data or vice versa;

compute, using algorithmic solutions, one or more measurements from a transmission time ascertained of a sending and a receiving of the message data between the RF devices to determine at least a distance between each of the RF devices having performed the sending and receiving of the message data, and further using measurements ascertained to determine a relative physical position of a vehicle and/or trailer associated with at least one of the RF devices; and generate data with respect to the measurements and physical position of the vehicle and/or trailer for either an operator of the vehicle and/or trailer, or for a vehicle control system to cause the vehicle and/or trailer to maneuver to the desired location or follow a path to the desired location.

2. The system of claim 1, wherein the processor is further configured to:

determine, using transmission times ascertained between RF devices from a distance to the desired location and to generate instructions to the vehicle and/or a trailer to assist an operator in maneuvering either to the desired location or to follow a path to the desired location.

3. The system of claim 1, further comprising:

a function of the RF device for marking a point of the desired location or a series of points for the path to the desired location to navigate the vehicle to maneuver to the desired location or for marking in an alternate, a point of an undesired location or series of points of undesired locations in manner to enable the vehicle to maneuver by a path to the desired location while avoiding the undesired location or locations.

4. The system of claim 1, further comprising:

at least one or more transceivers to transmit data in wireless protocols different from the UWB protocol for coupling with a vehicle, a trailer, or a mobile device.

5. The system of claim 1, further comprising:

attaching at least the first and second RF devices to a vehicle and trailers respectively, for monitoring the trailer when maneuvering the trailer by the vehicle by computing measurements and/or changes in measurements therebetween.

6. The system of claim 1, further comprising:

attaching the first and second RF devices to a load associated with a vehicle, trailer, or a combination thereof, for monitoring the load when maneuvering the vehicle or trailer by computing measurements and/or changes in measurements with respect to the load and the vehicle or trailer respectively.

7. The system of claim 1, wherein the processor is further configured to:

generate data with respect to the measurements and physical position of the vehicle for either an operator of the vehicle or for a vehicle control system to cause the vehicle to maneuver in manner to avoid a particular location or to follow a path around particular locations.

8. An apparatus for wireless communication in an ecosystem of wireless devices interconnected for assisting a vehicle, or a vehicle and trailer in maneuvers, comprising:

at least one radio frequency (RF) system configured to operate as part of a vehicle system, a trailer system or combination thereof, or as an independent unit with wireless connectivity to the vehicle and/or trailer system or other independent unit to form the ecosystem of wireless devices interconnected wherein the RF system includes a transceiver for the wireless connectivity with extended range capabilities wherein each RF system comprises: at least one vehicle RF system, at least one trailer RF system and at least one independent RF unit system;

a processor disposed within the RF system communicatively coupled to at least another one RF system, the processor configured to:

generate a unique data packet for each of the at least one RF system;

generate an instruction for each of the at least one RF system to transmit the unique packet associated with the at least one RF system;

receive, from the at least one RF system at least one response packet transmitted from the at least another one RF system wherein the at least another one RF system corresponds to the vehicle, trailer, or independent unit or is a combination thereof;

determine, for each received response packet, a distance between a corresponding receiving one of the at least one vehicle RF system, one trailer RF system or one independent RF unit system and a corresponding transmitting one of the at least, one vehicle RF system, one trailer RF system or one independent RF unit system based upon a time of flight of a corresponding transmitted unique packet and a corresponding response packet;

determine a relative physical position of one or more of at least one vehicle RF system, one trailer RF system or one independent RF unit system, and each of the at least one vehicle RF system, one trailer RF system or one independent RF unit system based upon the determined distance; and generate, based upon the determined relative physical position of the at least one vehicle RF system, of the at least one trailer RF system, or of the one independent RF unit system, data to maneuver the vehicle or vehicle and trailer to a desired location or avoid an undesired location.

9. The apparatus of claim 8, further comprising:

a function of the RF system for marking a point of the desired location or a series of points for a path to the desired, or for marking a point of the undesired location or a series of points of undesired locations for defining a boundary to avoid, and for enabling the vehicle to navigate or maneuver to the desired location or avoid the undesired location.

10. The apparatus of claim 8, further comprising:

generate, based on data of the at least one trailer RF system, or of the one independent RF unit system a plurality of dimensions of the trailer for assessing a plurality of attributes associated with the trailer for assisting the vehicle or vehicle and trailer in maneuvers.

11. The apparatus of claim 8, wherein the instructions cause a control system of the vehicle to operate in an autonomous or semi-autonomous mode and to either in an automated or semi-automated manner assist vehicle maneuvers to the desired location or avoid the undesired location.

12. The apparatus of claim 8, wherein the ecosystem of wireless devices interconnected includes at least two RF systems, wherein the processor is further configured to determine the relative physical position of two or more of a plurality of RF systems in the ecosystem consisting of the following: each of the at least one of the vehicle RF system, each of the at least one trailer RF system and each of the independent RF unit system by estimating the position of the at least one of the plurality of RF systems relative to at least two of any other RF systems in the ecosystem.

13. The apparatus of claim 8, wherein the ecosystem of wireless devices interconnected includes at least two RF systems, wherein the processor is further configured to determine the relative physical position of two or more of a plurality of RF systems in the ecosystem for monitoring a load or a trailer or combination associated thereof wherein the RF systems consisting of the following: one vehicle RF system, one trailer RF system or one independent RF unit system, and each of the at least one vehicle RF system, one trailer RF system or one independent RF unit system.

14. The apparatus of claim 8, wherein the RF system further comprising:
   at least one or more transceivers for capabilities to transmit data differently than in the extended range capability between each RF system in order to connect with the vehicle, the trailer, or a mobile device.

15. A method for monitoring and assisting a vehicle and trailer in maneuvers, the method comprising:
   coupling at least a first and second radio frequency (RF) device together in a manner to allow for data exchanges therebetween wherein both the first and second RF device are each configured with a respective ultra-wide band (UWB) transceiver for enabling, using UWB wireless protocols, couplings at extended ranges therebetween wherein the first and second RF device are associated with a trailer and an entity for monitoring or maneuvering the trailer wherein the entity includes an operator of a vehicle or a vehicle control system, each RF device further comprises:
   generating by a processor disposed locally within each RF device a request for a data packet to send between the first and second RF device to enable a measurement of a distance to be determined between each RF device based on a time of flight of a data packet transmitted back and forth between each RF device;
   generating a request for location data between each RF device wherein the first RF device sends location data in response thereof and the second RF device receives the location data or vice versa;
   computing, using algorithmic solutions, one or more measurements from a transmission time ascertained of a sending and a receiving of the location data between each RF device to determine at least a distance between each of RF device which performs the sending and receiving of the location data, and further using measurements ascertained to determine a relative physical position of a trailer associated with at least one of each RF device; and
   generating data with respect to the measurements and the relative physical position of the vehicle to the entity to cause the trailer to maneuver to a desired location or follow a path to the desired location, or to maneuver in a manner to avoid an undesired location.

16. The method of claim 15, further comprising:
   configuring the processor to determine the relative physical position of each RF device by estimating the position of more than two of the RF devices corresponding to the trailer, vehicle, and entity.

17. The method of claim 15, further comprising:
   marking points by a function of the RF device for the desired location or a series of points for the path to the desired location, or for marking points of the undesired location or a series of points of undesired locations for defining a boundary to avoid, and for enabling the vehicle to navigate or maneuver to the desired location or avoid the undesired location.

18. The method of claim 15, further comprising:
   transmitting by at least one or more transceivers data in wireless protocols different from the UWB protocol for connecting with a vehicle, a trailer, or a mobile device.

19. The method of claim 15 wherein the first and second RF devices are associated with a trailer and an entity for monitoring loads associated with the trailer and/or vehicle.

20. The method of claim 15, comprising:
   instructing, by the data, the entity to operate in an autonomous or semi-autonomous manner to maneuver to the desired location or avoid the undesired location.

* * * * *